United States Patent
Hinkley et al.

(10) Patent No.: US 10,900,329 B2
(45) Date of Patent: Jan. 26, 2021

(54) MODEL TUNING USING BOUNDARY FLUX SECTOR SURROGATES

(71) Applicant: LANDMARK GRAPHICS CORPORATION, Houston, TX (US)

(72) Inventors: Richard Edward Hinkley, Houston, TX (US); Terry Wayne Wong, Houston, TX (US); Graham Christopher Fleming, Houston, TX (US)

(73) Assignee: LANDMARK GRAPHICS CORPORATION, Houston, TX (US)

( * ) Notice: Subject to any disclaimer, the term of this patent is extended or adjusted under 35 U.S.C. 154(b) by 535 days.

(21) Appl. No.: 15/565,129

(22) PCT Filed: Jun. 17, 2015

(86) PCT No.: PCT/US2015/036273
§ 371 (c)(1),
(2) Date: Oct. 6, 2017

(87) PCT Pub. No.: WO2016/204754
PCT Pub. Date: Dec. 22, 2016

(65) Prior Publication Data
US 2018/0112498 A1  Apr. 26, 2018

(51) Int. Cl.
*E21B 41/00* (2006.01)
*G06F 16/29* (2019.01)
(Continued)

(52) U.S. Cl.
CPC .......... *E21B 41/0092* (2013.01); *E21B 44/00* (2013.01); *G06F 9/455* (2013.01);
(Continued)

(58) Field of Classification Search
CPC ...... E21B 41/0092; E21B 44/00; E21B 49/00; G06F 16/29; G06F 16/2228; G06F 9/455;
(Continued)

(56) References Cited

U.S. PATENT DOCUMENTS 9,372,943 B2 * 6/2016 Li ........................ G01V 99/005
10,287,857 B2 * 5/2019 Gorell ..................... G06F 30/20
(Continued)

FOREIGN PATENT DOCUMENTS

WO   WO-2009075945 A1   6/2009

OTHER PUBLICATIONS

Mohaghegh et al. "Grid-Based Surrogate Reservoir Modeling (SRM) for Fast Track Analysis of Numerical Reservoir Simulation Models at the Grid block Level". Mar. 19-23, 2012. SPE 153844. 13 Pages.*
(Continued)

*Primary Examiner* — Eunhee Kim

(57) ABSTRACT

In some embodiments, a system, as well as a method and an article, may operate to generate map values for a plurality of parameters corresponding to respective grid blocks of a reservoir, wherein the values have been previously generated based on an initial simulation result from a model of the reservoir; to generate a sector surrogate model that includes a subset of grid blocks of the reservoir based on a criterion for identifying grid blocks that negatively affect simulation of the reservoir; to provide data inputs to execute a simulation of the reservoir using the sector surrogate model; and to generate revised data inputs, based on results of the simulation of the reservoir using the sector surrogate model, to use in a subsequent simulation using the model of the reservoir. Additional apparatus, systems, and methods are disclosed.

20 Claims, 6 Drawing Sheets

(51) Int. Cl.
  *G06F 16/22* (2019.01)
  *G06T 17/05* (2011.01)
  *G06T 17/10* (2006.01)
  *G06F 9/455* (2018.01)
  *G06F 30/20* (2020.01)
  *E21B 44/00* (2006.01)
  *G01V 99/00* (2009.01)
  *G06F 111/10* (2020.01)
  *E21B 49/00* (2006.01)

(52) U.S. Cl.
  CPC .......... *G06F 16/2228* (2019.01); *G06F 16/29* (2019.01); *G06F 30/20* (2020.01); *G06T 17/05* (2013.01); *G06T 17/10* (2013.01); *E21B 49/00* (2013.01); *G01V 99/005* (2013.01); *G01V 2210/663* (2013.01); *G06F 2111/10* (2020.01)

(58) Field of Classification Search
  CPC ...... G06F 30/20; G06F 2111/10; G06T 17/05; G06T 17/10; G01V 99/005; G01V 2210/663
  See application file for complete search history.

(56) References Cited

U.S. PATENT DOCUMENTS

| | | |
|---|---|---|
| 2011/0022363 A1 | 1/2011 | Furman et al. |
| 2011/0238392 A1 | 9/2011 | Carvallo et al. |
| 2011/0307230 A1 | 12/2011 | Lee et al. |
| 2013/0035919 A1 | 2/2013 | Al-Shammari |
| 2013/0118736 A1* | 5/2013 | Usadi .................. G06N 3/0427 166/268 |
| 2013/0246030 A1* | 9/2013 | Usadi .................... E21B 43/12 703/10 |
| 2014/0214387 A1* | 7/2014 | Tilke ..................... E21B 43/305 703/10 |
| 2016/0187534 A1* | 6/2016 | Dogru ................. G01V 99/005 703/2 |
| 2017/0009036 A1* | 1/2017 | Xie ........................... C08J 9/00 |

OTHER PUBLICATIONS

Canadian Intellectual Property Office, Application No. 2,985,576, Sep. 10, 2018, 7 pages, Canada.

French Patent Office, Application No. 1654096, Preliminary French Search Report and Written Opinion, dated Jan. 24, 2019, 11 pages, France.

V. Artus, E. Tauzin, and O. Houzè, Efficient Proxies for Numerical Simulation of Unconventional Resources, URTeC 1896873, Aug. 25-27, 2014, 16 pages, Unconventional Resources Technology Conference (URTeC), Denver, Colorado. USA.

Korean Intellectual Property Office, International Search Report and Written Opinion, dated Mar. 9, 2016, 10 pages, International Application PCT/US2015/036273, Korea.

* cited by examiner

MODEL TUNING USING BOUNDARY FLUX SECTOR SURROGATES

CROSS-REFERENCE TO RELATED APPLICATIONS

This application is a U.S. national stage patent application of International Patent Application No. PCT/US2015/036273, filed on Jun. 17, 2015, the benefit of which is claimed and the disclosure of which is incorporated herein by reference in its entirety.

BACKGROUND

Simulation of oil and gas reservoirs contributes to the financial health of oil and gas exploration and production corporations. Corporations use simulation models to perform simulation to determine where to direct exploration and production operations for the greatest economic benefit. Operators can improve the accuracy of simulations by adjusting the models according to updated field data obtained during production and exploration. During the model adjustment process, and the forecasting phase that follows, operators will execute the full model hundreds if not thousands of times. Therefore, it is useful to reduce the "run time", which is the time it takes to execute the model. Optimizing simulation run time performance is a process known as tuning. Ordinarily tuning is computationally expensive.

DETAILED DESCRIPTION

To address some of the challenges described above, as well as others, apparatus, systems, and methods are described herein to perform tuning of reservoir simulation models by selectively tuning only a portion of the full reservoir simulation model at a time, while maintaining accuracy of the resulting full-field simulations. The portion to be tuned can be selected based on various criteria as described herein.

Oil, gas, and water are produced from underground rock formations, comprised of porous rocks filled with fluid. Depending on the pore size, the rocks can be permeable, such that the rocks allow fluids to flow through the pores. When hydrocarbons (either in a liquid or gaseous phase) are trapped in such formations, it may be possible to extract the hydrocarbons by drilling wells that penetrate the formation. The relative amounts of oil, gas, and water produced at the surface will depend on the fraction of the rock pore space that is occupied by each type of fluid.

The characteristics of the rock (including porosity and permeability) in an oil reservoir vary greatly from one location to another and accordingly the amount of oil, gas, and water that can be produced will vary from reservoir to reservoir. Reservoir simulation contributes to the financial success of oil and gas exploration and production companies because reservoir simulation aids in the understanding of chemical, physical, and fluid flow processes occurring in a petroleum reservoir. This understanding can help operators predict future behavior of a reservoir and increase the recovery of hydrocarbons from the reservoir.

Because properties and processes of a reservoir are complex, operators execute or "run" computer programs, often referred to as reservoir simulators, to perform reservoir simulation through generation of a model of a reservoir. Reservoir simulators use mathematical and computer models that describe and predict the multiphase flow of oil and gas within a three-dimensional underground formation (e.g., a field). These mathematical models describe characteristics of the field at a future time and in terms of measurable quantities such as the production or injection rates of individual wells and groups of wells, the bottom hole or tubing head pressure at each well, and the distribution of pressure, and fluid phases within the reservoir.

Figure 1:
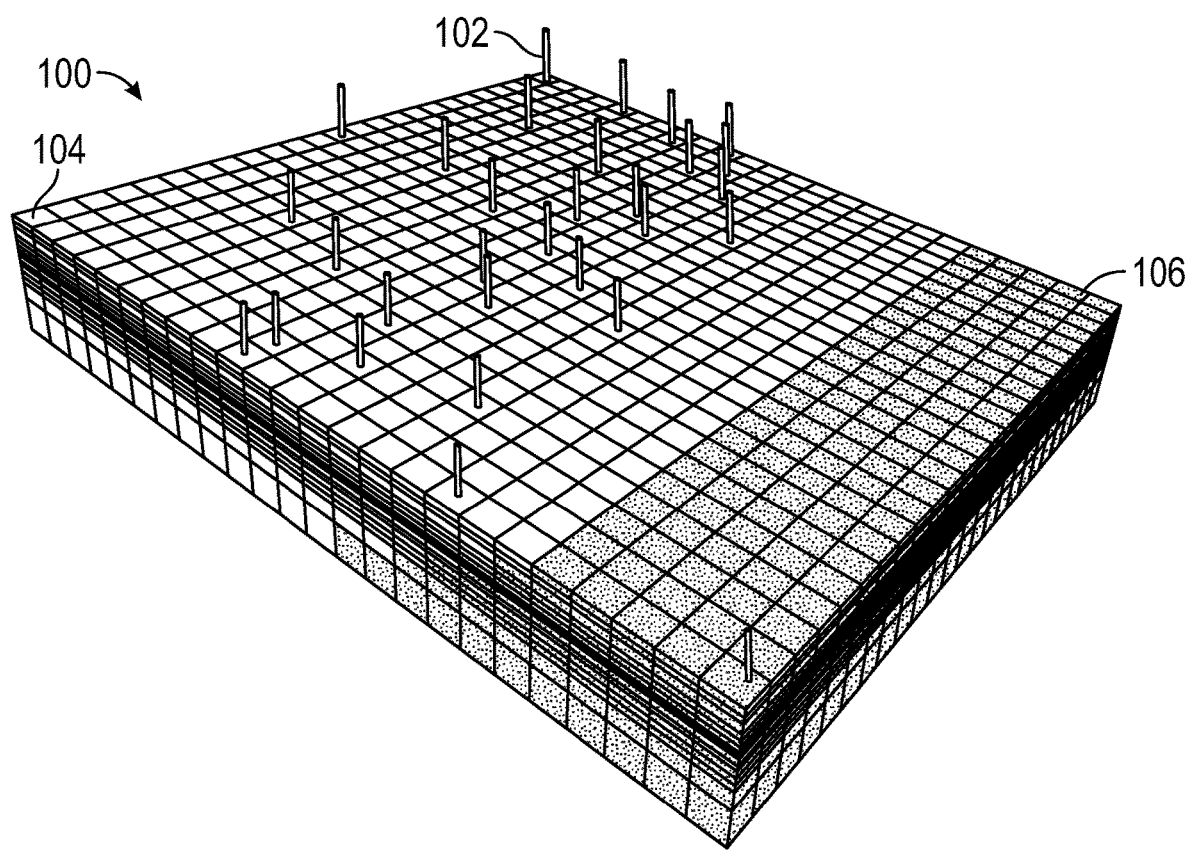
FIG. 1 is an illustration of a reservoir simulation model in accordance with some embodiments.

FIG. 1 is a an illustration of a reservoir simulation model 100 in accordance with some embodiments. To generate the mathematical models of a reservoir, some systems, for example the Nexus® software package available from Halliburton Co. of Houston, Tex., divide the reservoir volume into a large number of interconnected cells, and estimate the average oil saturation, gas saturation, permeability, porosity and other rock properties for each cell. Other characteristics of the field include the thickness of the geological zones, the location and characteristics of geological faults, relative permeability and capillary pressure functions and such characteristics of the reservoir fluids as density, viscosity, and phase equilibrium relationships. The mathematical modeling process also makes use of seismic data, well logs, and rock cores recovered when wells 102 are drilled.

As shown in FIG. 1, the reservoir simulation model 100 includes graphical indicators or color-coding to indicate cell properties. For example, FIG. 1 could show that cells 104 exhibit oil saturation, and that cells 106 exhibit water saturation, or the coding could indicate any other type of comparison of geophysical properties within cells. The illustration shown in FIG. 1, as well as similar illustrations and illustrations showing relative values of other rock properties, can be displayed on a graphical user interface (GUI) presented by a display.

Some simulation systems model the reservoir by numerically solving a system of one or more nonlinear, partial differential equations (PDEs) that describe the behavior of the field as a function of time and production parameters. These production parameters can include the locations of wells, the characteristics of the well completion for each well, and the operating constraints applied to the wells. Operating constraints may include the production rate of a particular fluid phase, the bottom hole pressure, the tubing head pressure, or the combined flow rates of a group of wells. These constraints may be applied directly by data or by means of another simulator that models the flow of fluids in the surface equipment used to transport the fluids produced from or injected into the wells.

Operators analyze production from an oil reservoir by sequentially performing a number of simulation runs. A reservoir simulation run is the numerical simulation of fluid flow within the reservoir, usually by executing a series of program instructions, using a particular set of reservoir properties and constraints on production and injection. The time required for a given simulation run is governed by not only the reservoir properties and constraints, but also by certain modeling and solution methodologies that are under the operator's control. Often it is possible to significantly accelerate the pace of simulation, although finding the best solution methodologies and optimal modeling options to do so requires largely a trial and error procedure that requires many runs of the full field case. After each simulation run, simulation software or other systems compare the results of that simulation run with data gathered in the oil field during the entire period of production. Based on these comparisons, operators modify the mathematical model of the reservoir and perform another simulation run using the revised mathematical model. This process continues until the mathematical reservoir model behaves like the real oil reservoir.

Once the mathematical model behaves like the real oil reservoir, operators can predict future production based on a variety of operating plans. Operators can perform additional simulation runs using each operating plan, and then compare the simulation results and select which operating plan to use based on these results to maximize oil recovery while minimizing production costs. After a production plan is chosen and operations begin, operators can periodically run the reservoir model and tune the reservoir model such that the reservoir model matches newly gathered production data.

However, tuning full-field reservoir simulation models is computationally expensive and time-consuming, as some full-field reservoir simulation models can include several million grid blocks or more, wherein grid blocks are comprised of cells such as shown in FIG. 1. Consequently, operators may omit or abbreviate the tuning process, resulting in an inefficiency that multiplies over the life of a simulation project. Various embodiments described herein reduce computation time by selecting a representative surrogate model with a size in the range of roughly several thousand grid blocks.

Choosing Sector Surrogates

A modeling system in accordance with various embodiments chooses boundary flux sectors, using criteria described later herein, as surrogate models for full field tuning. Boundary flux sector models are simulation runs for which time-dependent boundary flux data has been retained from the full field run and applied during a sector model run. Some embodiments can make use of sector models provided in existing simulation systems, for example the Nexus® system, to study portions of reservoirs. Boundary flux sectors should be identical or nearly identical to the full-field model to the extent that the sector corresponds to a corresponding portion of the full-field model. Further, boundary flux sectors should experience the same geophysical and other conditions, as well as numerical solution challenges, as the full field model, in the particular area of application of the corresponding boundary flux sector.

Frequently, the zones of numerical challenge evolve during the life of a reservoir as new wells appear or as displacements pass through phase boundaries or multi-phase flow states. Therefore, some embodiments may operate to select multiple sectors for accurate and thorough surrogate tuning and to keep surrogates to a manageable size. Methods in accordance with various embodiments choose the domain and quantity of the sector surrogates based on an analysis of a full field base run. A processor, for example the processor 620 described later herein with respect to FIG. 6, can implement one or more operations of these example methods.

In one example method, the processor 620 will operate to construct a geographically referenced map of cells that includes values for various parameters and properties obtained over the entire span of the full field run. One of these parameters can include the number of times a cell was responsible for solution damping. Damping is a technique used during the Newton iterations of a time step calculation to prevent the solution of any iteration from venturing outside of a quick convergence zone. Many different conditions trigger damping, and damping is done to accelerate convergence, but consistent damping in any one cell can significantly retard performance. Accordingly, it can be important for various embodiments to recognize those cells that are responsible for damping.

Figure 2:
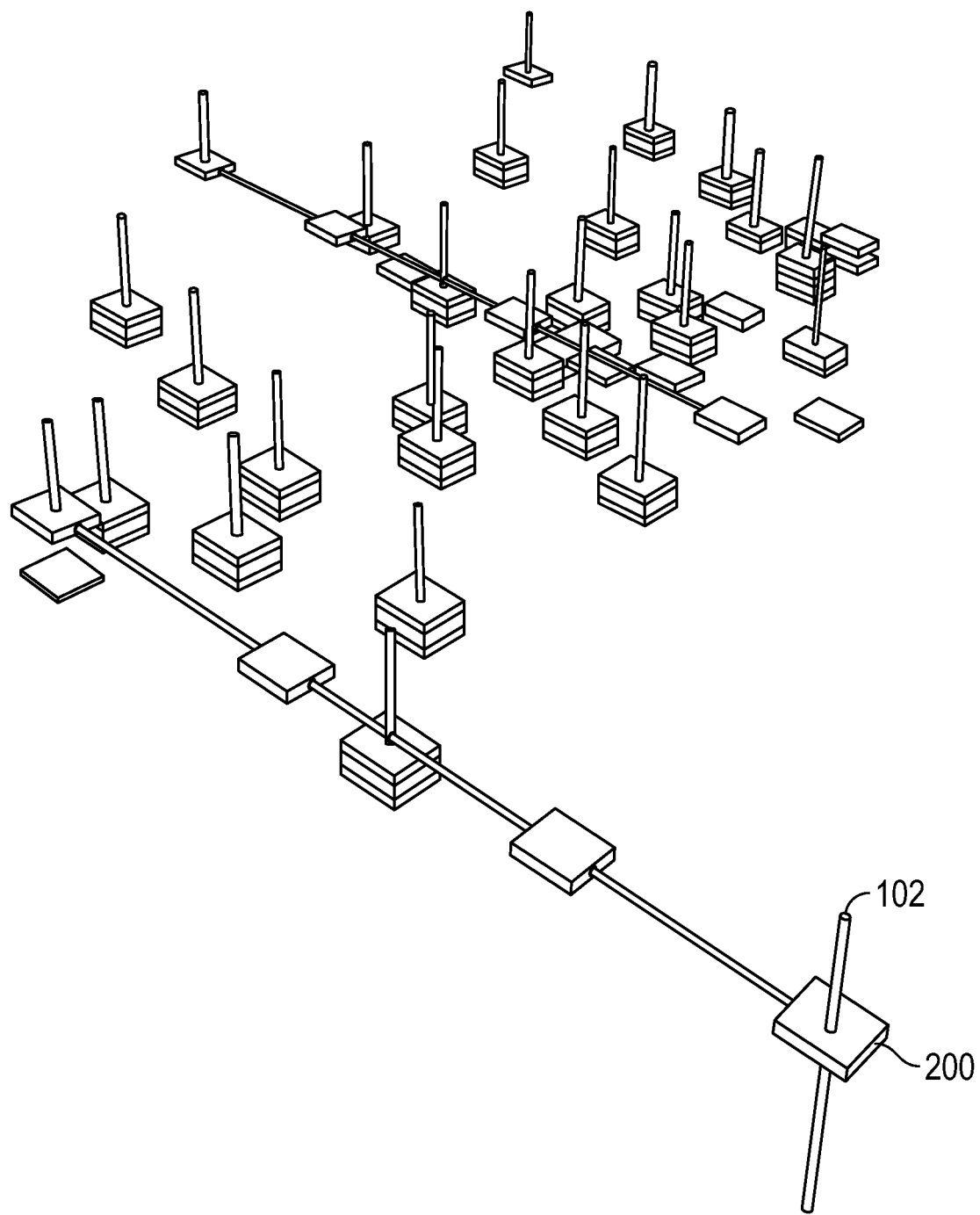
FIG. 2 illustrates cells of the reservoir simulation model in FIG. 1 that were responsible for damping during a simulation run in accordance with some embodiments.

FIG. 2 illustrates cells 200, 202 of the reservoir simulation model in FIG. 1 that were responsible for damping during a simulation run in accordance with some embodiments. While only two of the cells 200, 202 are numbered, all of the cells shown in FIG. 2 were responsible for solution damping at least once. As will be appreciated upon comparing FIG. 1 and FIG. 2, the cells 200, 202 that caused damping can be located in various portions of the overall reservoir simulation model 100. Some cells 200, 202 can be directly under wells 102. In some scenarios, several stacked cells can be found to have caused damping. Color-coding can be used to indicate cells that were responsible for damping several times, versus cells that were responsible for damping only once or twice. For example, cell 202 may have been responsible for solution damping more times than was cell 200.

The processor 620 may operate to map several other parameters or properties. Some examples are described below, although the processor 620 may operate to map any other parameters or properties of rock or other parameters of interest for oil and gas production. For example, the processor 620 may operate to map the number of times a cell limited timestep size by DCMAX, wherein DCMAX is the maximum mass or mole fraction change occurring in a cell. The processor 620 may operate to map the amount of time that a cell spends in a three-phase state, wherein the three phases include oil, gas, and water. The processor 620 may operate to map the amount of time that a cell spends near the critical point, wherein the critical point is defined as the pressure and temperature of a reservoir fluid where the properties of the gas phase become identical to the properties of the oil phase. The processor 620 may operate to map the average throughput per cell or per cell volume.

Additionally, the processor 620 may operate to map the number of times a timestep cut occurred because of given block, or the number of times a given block was used to set the smallest timestep to date. As used herein, the term "timestep" is defined as an increment of time into which the life of a reservoir is discretized. For at least certain types of timesteps, a reservoir simulator computes changes of parameters in the grid blocks over a timestep for many timesteps.

In order to reduce complexity, the reservoir simulator defines conditions only at the beginning and end of a timestep. Consequently, conditions within each grid block may change abruptly from one timestep to the next. Reservoir simulators balance the need for simulation stability versus the need for reduced complexity in choosing the size of timesteps, and such sizes can be adjusted automatically or by operators or other human users. The ability to adjust the timestep size is useful, because too large a timestep can result in the calculations failing to converge, and too small a timestep can result in a lot of computation to calculate only a very small change in the conditions in each grid block.

Further, the processor 620 may operate to map the cumulative gridblock error, or the number of times a given cell controlled convergence. The processor 620 may operate to map average and maximum Courant-Friedrichs-Lewy (CFL) numbers, wherein CFL numbers are a measure of Implicit Pressure, Explicit Saturation (IMPES) stability as understood by those of ordinary skill in the art.

In at least some embodiments, the processor 620 will operate to construct a composite map considering all, or a subset, of the above factors or other factors, equally weighted. Accordingly, cells that more negatively affected a simulation run, by contributing to the above factors or other factors, will have a greater weight. In some embodiments, the processor 620 will operate to search for clusters in this composite map that can be found within a search radius encompassing a predefined number of cells (e.g., 50,000 cells), wherein a cluster is defined by cells having high weighed values. In embodiments, the processor 620 may operate to bias this search to include as many wells 102 as possible. This may result in multiple cluster groupings.

In at least some embodiments, the processor 620 will operate to search for cells that are outliers that are not found within clusters, and include those cell outliers within nearest cluster. Accordingly, as will be appreciated, sectors do not have to include contiguous cells. In some embodiments, the processor 620 will operate to determine if there are only limited time spans that cluster groupings are active, and remove those cluster groupings from consideration in the choosing of sector surrogates.

In at least some methods in accordance with embodiments, the processor 620 will operate to choose the top-weighted N cluster groupings based on the above criteria, wherein N is the number of cluster groupings selected, to serve as sector surrogates for further operations.

Figure 3:
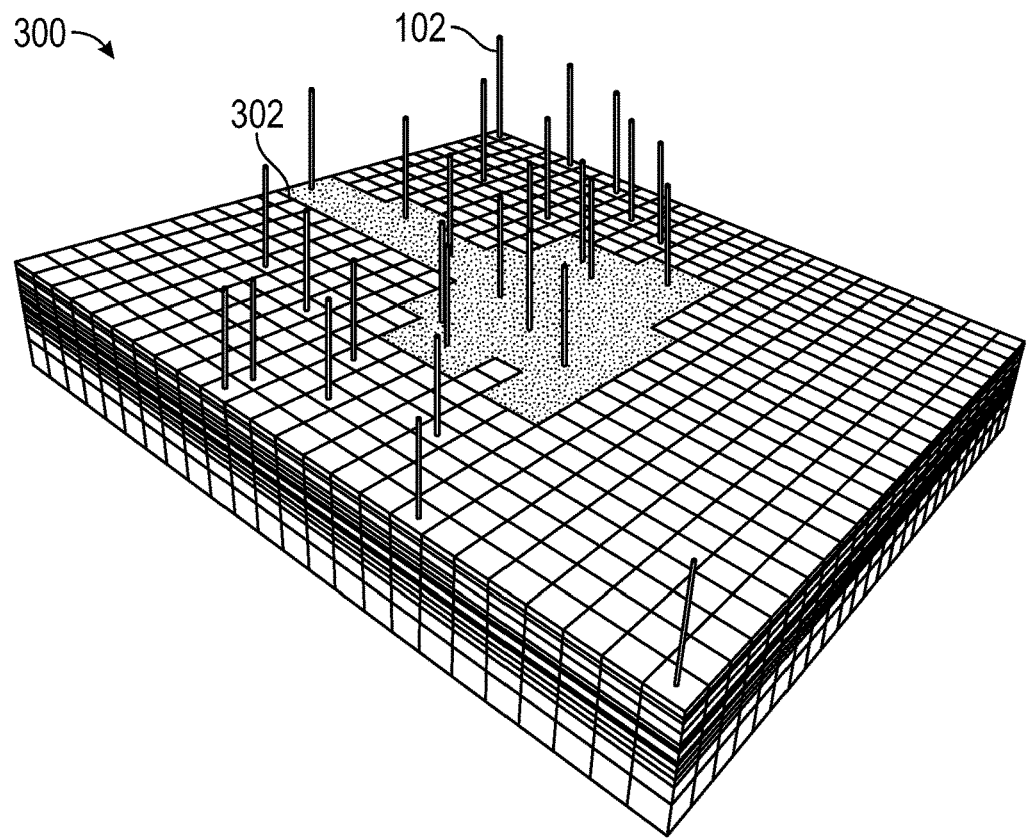
FIG. 3 illustrates selection of a surrogate model in accordance with some embodiments.
Figure 4:
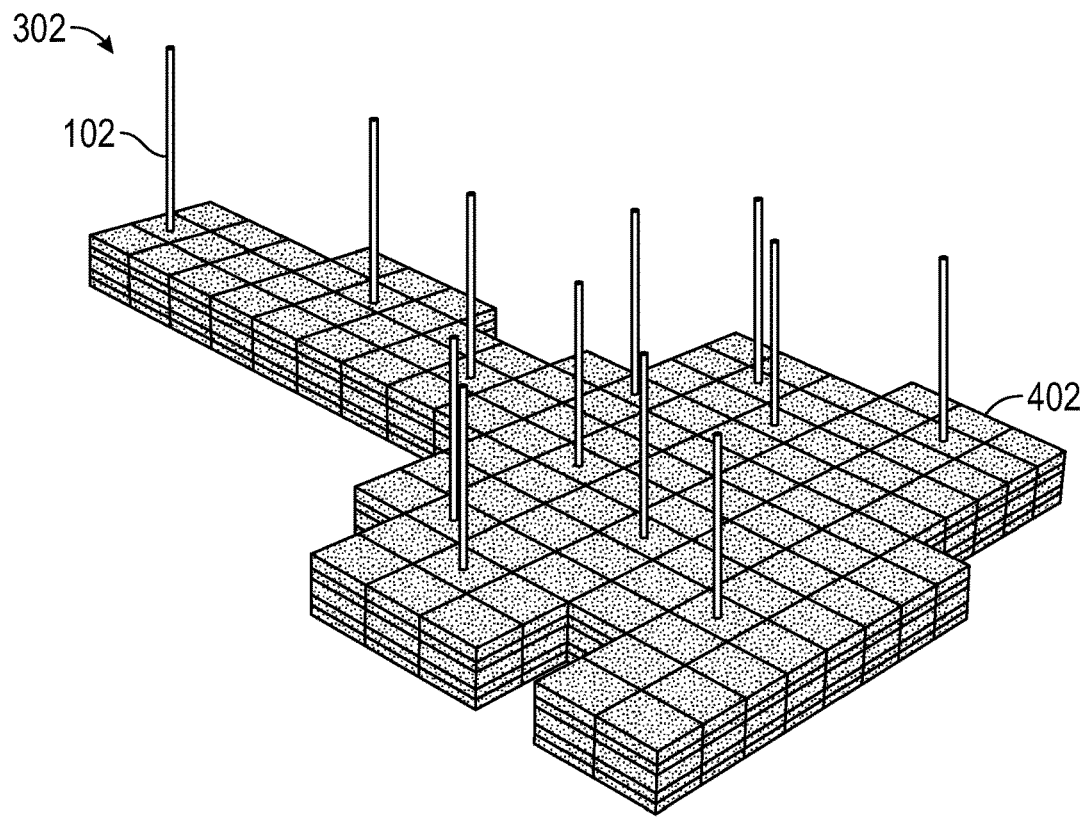
FIG. 4 illustrates the selected surrogate model of FIG. 3 in accordance with some embodiments.

FIG. 3 illustrates a surrogate model 302 in accordance with some embodiments. FIG. 4 illustrates the selected surrogate model 302 of FIG. 3 in accordance with some embodiments. While one surrogate model 302 is depicted, it will be appreciated that more than one surrogate model 302 may have been selected by the processor 620. Further, a single surrogate model 302 can include any number of cells, and the cells in a single surrogate model 302 are not necessarily contiguous.

Tuning Sector Surrogates

Before tuning sector surrogates, the processor 620 may operate to analyze the initial simulation run or prior simulation run for patterns of behaviors that are the controlling behaviors. For example, a saturation front or a compositional front may be a controlling behavior if it causes rapid saturation or composition changes that require a small timestep size to converge. Identification of a controlling behavior will guide the processor 620 in tuning sector surrogates.

Once the processor 620 has chosen sector surrogates, the processor 620 or other computing system performs a run of the full field model to capture the boundary flux values for the designated sectors.

Tuning can include subjecting one of the sector surrogates (e.g., the sector surrogate having the highest composite or weighted value according to the criteria described earlier herein) to a wide range of data adjustment and numerical control adjustments with the purpose of finding a highly tuned model. Tuning can be terminated when all the adjustable parameters have been tested. Any data changes that result in unacceptable differences in results from a base surrogate run are rejected (e.g., when the end result lies outside of acceptable boundary conditions).

In various embodiments, the processor 620 can operate to apply data adjustment using one or more of several techniques. As a first example, the processor 620 may operate to perform spline adjustment of relative permeability near residual end points and near data kinks representing discontinuities. As a second example, the processor 620 may operate to perform rationalization of saturation end points used for scaling. As will be appreciated, end points entered by operators may cause extreme variation in relative permeability over small saturation intervals. This extreme variation is not related to physical conditions of the reservoir and can make numerical solution difficult.

Data adjustment can further include the processor 620 operate to truncate extreme capillary pressures. Operators sometimes input extremely large capillary pressure at the extremes of tables. This causes negative effects on IMPES simulation runs. In some scenarios, extreme capillary pressure can be truncated without affecting results, while improving simulation performance.

In embodiments, the processor 620 may operate to perform data adjustment by examining PVT tables (or EOS tables) for areas of negative compressibility, excessive extrapolation, negative densities or viscosities, and areas where gas density/viscosity exceed oil density/viscosity. These values can negatively affect simulation runs and accordingly the processor 620 may operate to change some of these values in data adjustment and provide the revised values as inputs to sector surrogates for further simulation runs.

In embodiments, the processor 620 may operate to examine and change grid tolerances (e.g., tolerances that will exclude grid blocks from the model due to numerical computation problems, such as those controlled by the 'CORTOL' keyword in Nexus® systems). The above examples of data adjustment techniques are for illustrative purposes and are non-limiting. The processor 620 may operate to adjust other well-related values, network values, etc., and subject the sector surrogates to those adjusted values.

In other embodiments, the processor 620 can vary the values for various parameters over a defined numerical range, such as for 100-500 simulation runs. In this case, the parameter space for optimization is too large to comprehensively explore, even for a surrogate model. However, the processor 620 or other system can operate to identify parameters, based on historical data or other data, to which models have or are predicted to have important sensitivities. The processor 620 can then vary values for just those sensitivities. The numerical parameter tuning will then consist of approximately 100-500 runs using high/low combinations of various parameters with a bias towards the aforementioned known sensitivities. These various parameters can include parameters for comparing IMPES versus implicit model formulations.

As known to those of ordinary skill in the art, an implicit model formulation expresses inter-block flow terms using implicit (new time level) values of all variables in all grid blocks, as opposed to the explicit formulation in which the old time level value is used. Numerous IMPES-type formulations are well-known and discussion thereof is not included as part of the description of example embodiments herein.

The processor 620 can operate to vary other numerical parameters, including parameters for optimizing linear solver parameters (e.g. type of preconditioner and convergence tolerance), parameters for optimizing timestep and Newton controls, DCMAX, minimum and maximum timestep size, and parameters based on controls related to other simulation software packages, etc. Embodiments are not limited to the processor 620 varying any particular numerical parameters.

Once the processor 620 has tuned the numerical parameters and implemented data adjustment using the highest rated sector surrogate, the processor 620 can apply the tuning results to the other sector surrogates models. If the results are not satisfactory i.e., if the performance for the other sector does not improve, then the processor 620 will optimize tuning considering two or more of the sector surrogates simultaneously.

Applying Surrogate Tuning to the Full Model

In some embodiments, the processor 620 will operate to use values for properties and parameters as determined according to data adjustment and variation of numerical parameters as described above, to perform at least one simulation run using the full field model. The processor 620 or other system will operate to evaluate this simulation run using the full field model for speed, accuracy, comparison of results with historical results, and other criteria. In some embodiments, the processor 620 may operate to repeat any or all of the above operations of sector surrogate selection, data massing, numerical tuning, etc., and apply revised results to simulation runs using the full field model, until speed and accuracy goals are achieved.

Example Methods and Systems for Performing Example Methods

Figure 5:
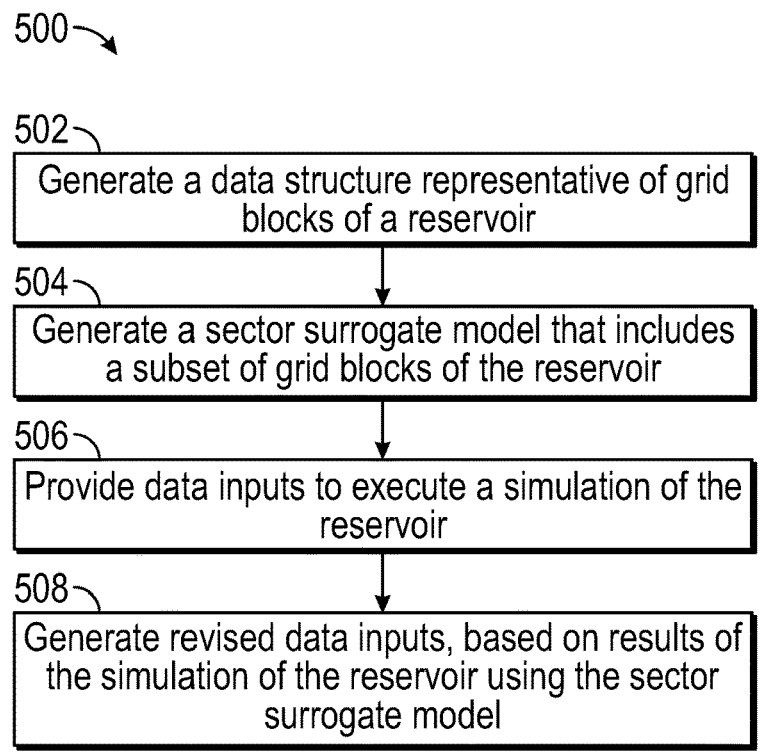
FIG. 5 is a flow chart illustrating a method in accordance with some embodiments.

FIG. 5 is a flow chart illustrating a method 500 in accordance with some embodiments. A processor, for example the processor 620 (FIG. 6), other processor, other circuitry, or another system, can perform one or more of the operations of method 500.

Figure 6:
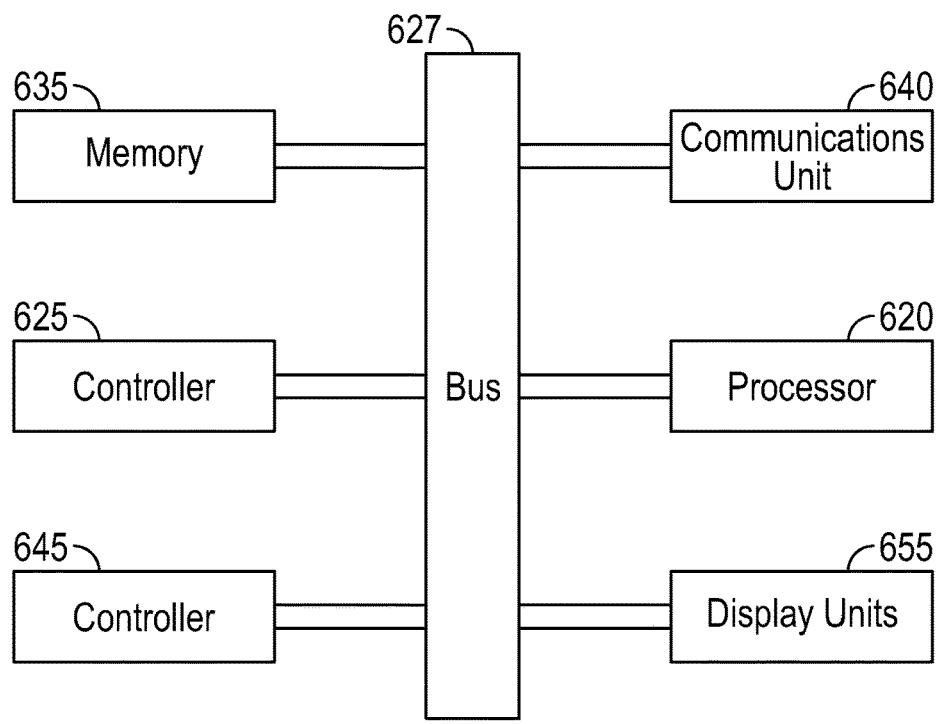
FIG. 6 is a block diagram of a computer system for implementing some embodiments.

The example method 500 begins with operation 502 with the processor 620 generating a data structure representative of grid blocks of a reservoir. The data structure can include values for a plurality of parameters corresponding to respective grid blocks of the reservoir. The processor 620 can provide instructions to a display 655 (FIG. 6) to cause the display to display a map or other graphical representation of the data structure (FIG. 6). The values may have been previously generated based on an initial simulation result from a model of the reservoir. The data structure can include geographically-referenced coordinates for grid blocks and production wells in a geographic region.

The example method 500 continues with operation 504 with the processor 620 generating a sector surrogate model that includes a subset of grid blocks of the reservoir based on a criterion for identifying those grid blocks that negatively affect simulation of the reservoir. One sector surrogate model is shown in FIGS. 3 and 4, and the criterion/criteria for generating the sector surrogate model was described earlier herein with reference to FIGS. 3 and 4. While only one sector surrogate model is shown, any number of sector surrogate models can be generated. In some embodiments, the sector surrogate model can include a cluster of grid blocks in such a fashion that at least some number of production wells is included within the cluster of grid blocks. In embodiments, the cluster of grid blocks can at least one grid block that is not geographically contiguous to at least one other grid block in the cluster.

The example method 500 continues with operation 506 with the processor 620 providing data inputs to execute a simulation of the reservoir using the sector surrogate model. The example method continues with operation 508 with the processor 620 generating revised data inputs, based on results of the simulation of the reservoir using the sector surrogate model, to use in a subsequent simulation using the model of the reservoir. Operations 506 and 508 were described earlier herein with respect to methods and embodiments for tuning sector surrogates.

The example method 500 can further include identification of a controlling behavior of the reservoir model based on the initial simulation result, and generating surrogate simulation results using input parameters to the sector surrogate model that have been selected based on parameters related to the controlling behavior. In at least these embodiments, the processor 620 can generate a plurality of surrogate simulation results using respective sets of input parameters to generate difference values between surrogate simulation results and between surrogate simulation results and the initial simulation result. Example input parameters can include parameters for spline adjustment of relative permeability at a critical point, wherein the critical point includes one of a residual end point and a data kink. Other example input parameters can be generated by truncating capillary pressures. Further example input parameters were described earlier herein, but it should be understood that various s embodiments are not limited to any particular input parameters or methods for generating input parameters. The processor 620 can operate to adjust input parameters within sensitivity ranges as described earlier herein with respect to data adjustment techniques and numerical control tuning.

The operations of example method 500 can further include generating several surrogate simulation results using respective sets of input parameters to generate difference values between surrogate simulation results and between surrogate simulation results and the initial simulation result. These difference values can be used to generate additional sets of input parameters for further simulation runs. The processor 620 can operate to adjust values for sets of input parameters within respective sensitivity ranges for those parameters. The processor 620 can operate to determine parameters for which simulations have sensitivities, based on simulation results using predicted high and low values for at least one parameter.

FIG. 6 is a block diagram of a computer system 600 for implementing some embodiments. Some components of the system 600, for example the processor 620, can perform operations of example method 500 or other example methods described earlier herein in accordance with various embodiments.

The system 600 can include a controller 625 and a memory 635. The controller 625 can operate to provide drilling coordinates to control a drilling instrument for recovering reservoir resources in drilling locations based on simulations of those reservoirs as described herein, or the system 600 can provide these coordinates to another system (not shown in FIG. 6) for controlling a drilling instrument.

The memory 635 can store data for generating reservoir simulations, such as parameter values, geographical coordinates, measurement values, simulation run results, etc. The processor 620 can access the stored data to perform reservoir modeling described herein, for example, or for other purposes.

For example, the processor 620 can use the equations to generate a data structure representative of grid blocks of a reservoir, wherein the data structure includes values for a plurality of parameters corresponding to respective grid blocks of the reservoir, and wherein the values have been previously generated based on an initial simulation result from a model of the reservoir. The processor 620 can operate to generate a sector surrogate model that includes a subset of grid blocks of the reservoir based on a criterion for identifying those grid blocks, represented in the data structure, that negatively affect simulation of the reservoir. The processor 620 can operate to provide data inputs to execute a simulation of the reservoir using the sector surrogate model, and the processor 620 can operate to generate revised data inputs, based on results of the simulation of the reservoir using the sector surrogate model, to use in a subsequent simulation using the model of the reservoir.

The communications unit 640 can provide downhole communications in a drilling operation, although such downhole communications can also be provided by any other system located at or near drilling coordinates of a surface of the Earth where drilling will take place. Such downhole communications can include a telemetry system.

The system 600 can also include a bus 627, where the bus 627 provides electrical conductivity among the components of the system 600. The bus 627 can include an address bus, a data bus, and a control bus, each independently configured. The bus 627 can also use common conductive lines for providing one or more of address, data, or control, and the controller 625 can regulate usage of these lines. The bus 627 can include instrumentality for a communication network. The bus 627 can be configured such that the components of the system 600 are distributed. Such distribution can be arranged between downhole components and components that can be disposed on the surface of a well. Alternatively, various ones of these components can be co-located, such as on one or more collars of a drill string or on a wireline structure.

In various embodiments, the system 600 comprises peripheral devices that can include displays 655, user input devices, additional storage memory, and control devices that may operate in conjunction with the controller 625 or the memory 635. For example, the peripheral devices can include a user input device to receive a selection of data types for which the system is to perform the data checking operations. The peripheral devices can include a display 655 for displaying solutions of the simulation, and drilling coordinates to control a drilling instrument for recovering resources from a grid block based on the simulation.

In an embodiment, the controller 625 can be realized as one or more processors. The display 655 can be programmed with instructions stored in the memory 635 to implement a GUI to manage the operation of components distributed within the system 600. A GUI can operate in conjunction with the communications unit 640 and the bus 627.

In various embodiments, a non-transitory machine-readable storage device can comprise instructions stored thereon, which, when performed by a machine, cause the machine to perform operations, the operations comprising one or more features similar to or identical to features of methods and techniques described herein. A machine-readable storage device, herein, is a physical device that stores data represented by physical structure within the device. Examples of machine-readable storage devices can include, but are not limited to, memory 635 in the form of read only memory (ROM), random access memory (RAM), a magnetic disk storage device, an optical storage device, a flash memory, and other electronic, magnetic, or optical memory devices, including combinations thereof.

One or more processors such as, for example, the processor 620, can operate on the physical structure of such instructions. Executing these instructions determined by the physical structures can cause the machine to perform operations to generate a data structure representative of grid blocks of a reservoir, wherein the data structure includes values for a plurality of parameters corresponding to respective grid blocks of the reservoir, and wherein the values have been previously generated based on an initial simulation result from a model of the reservoir; to generate a sector surrogate model that includes a subset of grid blocks of the reservoir based on a criterion for identifying those grid blocks, represented in the data structure, that negatively affect simulation of the reservoir; to provide data inputs to execute a simulation of the reservoir using the sector surrogate model; and to generate revised data inputs, based on results of the simulation of the reservoir using the sector surrogate model, to use in a subsequent simulation using the model of the reservoir.

The instructions can include instructions to cause the processor 620 to perform any of, or a portion of, the above-described operations in parallel with performance of any other portion of the above-described operations.

Figure 7:
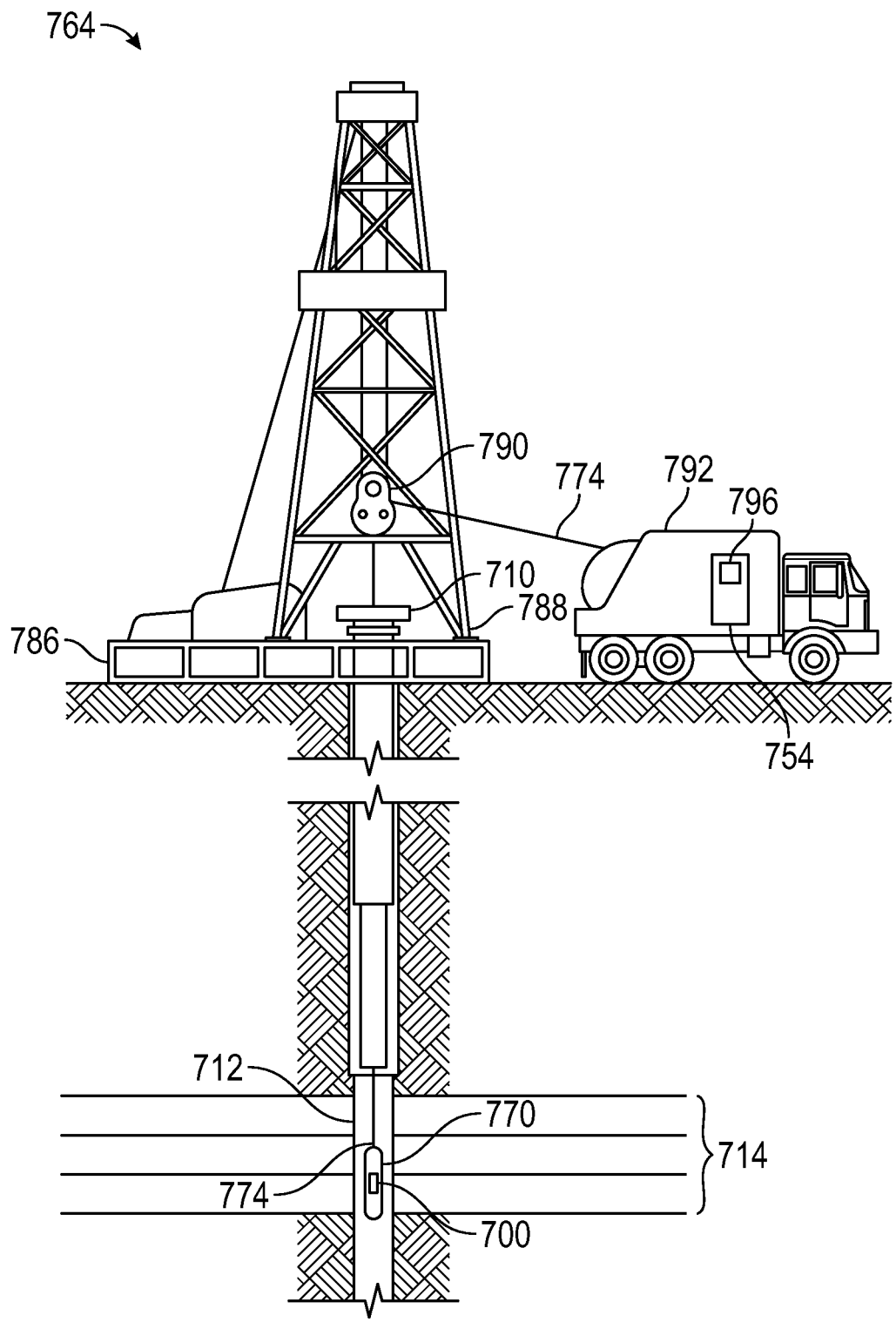
FIG. 7 illustrates a wireline system embodiment.
Figure 8:
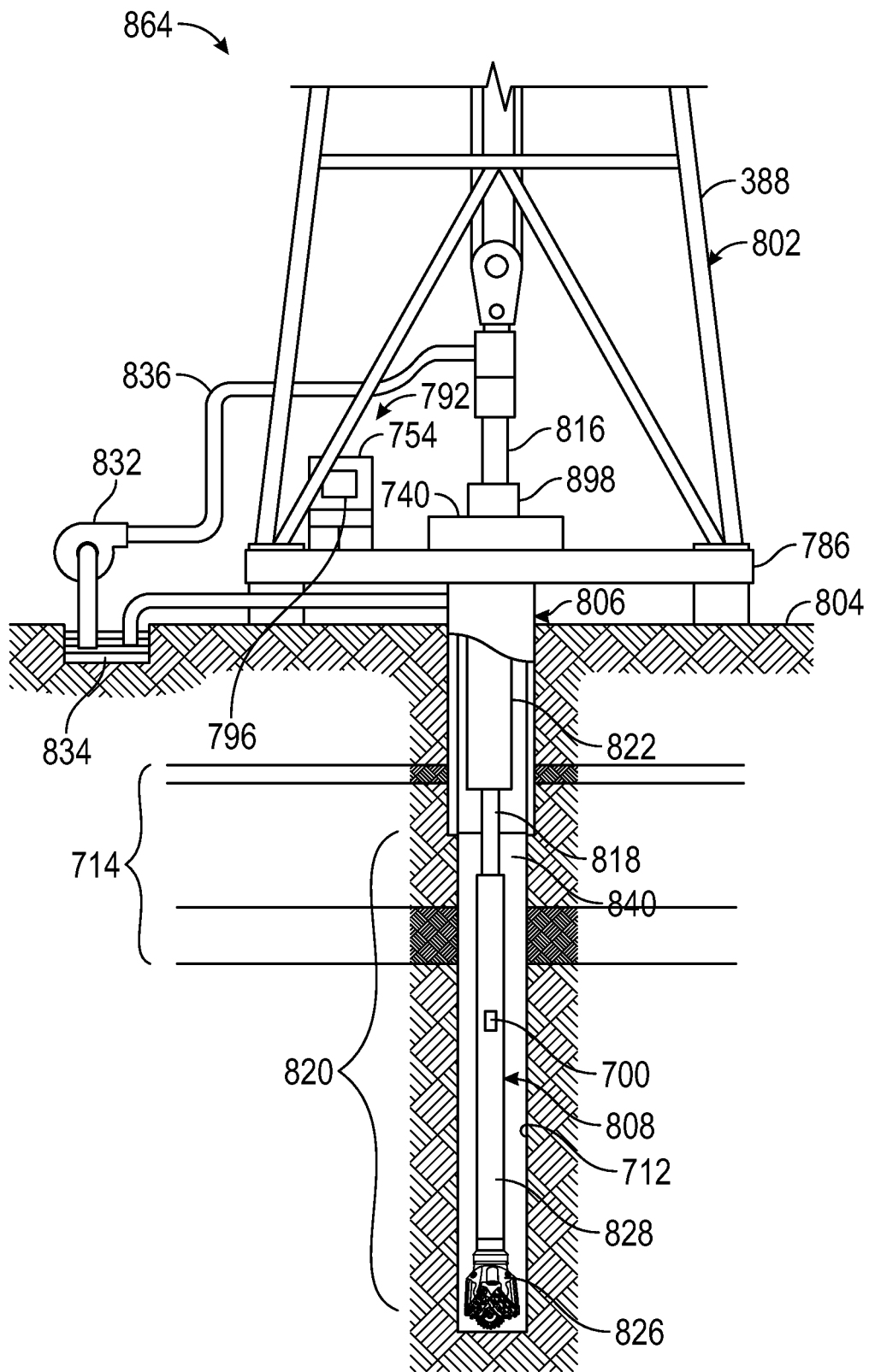
FIG. 8 illustrates a drilling rig system embodiment.

FIG. 7 illustrates a wireline system 764 embodiment of the invention, and FIG. 8 illustrates a drilling rig system 864 embodiment of the invention. Therefore, the systems 764, 864 may comprise portions of a wireline logging tool body 770 as part of a wireline logging operation, or of a down hole tool 828 as part of a down hole drilling operation. The systems 764 and 864 may comprise any one or more elements of the system 600 shown in FIG. 6.

Thus, FIG. 7 shows a well during wireline logging operations. In this case, a drilling platform 786 is equipped with a derrick 788 that supports a hoist 790.

Drilling oil and gas wells is commonly carried out using a string of drill pipes connected together so as to form a drilling string that is lowered through a rotary table 710 into a wellbore or borehole 712. Here it is assumed that the drilling string has been temporarily removed from the borehole 712 to allow a wireline logging tool body 770, such as a probe or sonde, to be lowered by wireline or logging cable 774 into the borehole 712. Typically, the wireline logging tool body 770 is lowered to the bottom of the region of interest and subsequently pulled upward at a substantially constant speed.

During the upward trip, at a series of depths, various instruments included in the tool body 770 may be used to perform measurements on the subsurface geological formations 714 adjacent the borehole 712 (and the tool body 770). The borehole 712 may represent one or more offset wells, or a target well.

The measurement data (e.g., formation and fluid property information) can be communicated to a surface logging facility 792 for processing, analysis, and/or storage. The logging facility 792 may be provided with electronic equipment for various types of signal processing, which may be implemented by any one or more of the components of the system 600 in FIG. 6. Similar formation evaluation data may be gathered and analyzed during drilling operations (e.g., during logging while drilling operations, and by extension, sampling while drilling). This measurement data can be used for generating initial geographical models for use in initial simulation runs, or for any other purpose with respect to the example methods herein.

In some embodiments, the tool body 770 is suspended in the wellbore by a wireline cable 774 that connects the tool to a surface control unit (e.g., comprising a workstation 754).

Turning now to FIG. 8, it can be seen how a system 864 may also form a portion of a drilling rig 802 located at the surface 804 of a well 806. The drilling rig 802 may provide support for a drill string 808. The drill string 808 may operate to penetrate the rotary table 710 for drilling the borehole 712 through the subsurface formations 714. The drill string 808 may include a Kelly 816, drill pipe 818, and a bottom hole assembly 820, perhaps located at the lower portion of the drill pipe 818.

The bottom hole assembly 820 may include drill collars 822, a down hole tool 828, and a drill bit 826. The drill bit 826 may operate to create the borehole 712 by penetrating the surface 804 and the subsurface formations 714. The down hole tool 828 may comprise any of a number of different types of tools including measurement while drilling tools, logging while drilling tools, and others, that can provide data for generation of geographical models to be used in formation 714 simulation.

During drilling operations, the drill string 808 (perhaps including the Kelly 816, the drill pipe 818, and the bottom hole assembly 820) may be rotated by the rotary table 710. Although not shown, in addition to, or alternatively, the bottom hole assembly 820 may also be rotated by a motor (e.g., a mud motor) that is located down hole. The drill collars 822 may be used to add weight to the drill bit 826. The drill collars 822 may also operate to stiffen the bottom hole assembly 820, allowing the bottom hole assembly 820 to transfer the added weight to the drill bit 826, and in turn, to assist the drill bit 826 in penetrating the surface 804 and subsurface formations 714.

During drilling operations, a mud pump 832 may pump drilling fluid (sometimes known by those of ordinary skill in the art as "drilling mud") from a mud pit 834 through a hose 836 into the drill pipe 818 and down to the drill bit 826. The drilling fluid can flow out from the drill bit 826 and be returned to the surface 804 through an annular area between the drill pipe 818 and the sides of the borehole 712. The drilling fluid may then be returned to the mud pit 834, where such fluid is filtered. In some embodiments, the drilling fluid can be used to cool the drill bit 826, as well as to provide lubrication for the drill bit 826 during drilling operations. Additionally, the drilling fluid may be used to remove subsurface formation cuttings created by operating the drill bit 826.

Any of the components described above with respect to FIGS. 6-8 can be characterized as modules, which may include hardware circuitry, and/or a processor and/or memory circuits, software program modules and objects, and/or firmware, and combinations thereof, as desired by the architect of the systems 600, 764 and 864, and as appropriate for particular implementations of various embodiments. For example, in some embodiments, such modules may be included in an apparatus and/or system operation simulation package, such as a software electrical signal simulation package, a power usage and distribution simulation package, a power/heat dissipation simulation package, and/or a combination of software and hardware used to simulate the operation of various potential embodiments.

Further examples of apparatuses, methods, a means for performing acts, systems or devices include, but are not limited to:

Example 1 is a method comprising operations wherein any of the apparatuses, systems or devices described above can include means for generating a sector surrogate model that includes a subset of grid blocks of a reservoir based on a criterion for identifying those grid blocks, represented in a data structure representing the grid blocks, that negatively affect simulation of the reservoir; providing data inputs to execute a simulation of the reservoir using the sector surrogate model; and generating revised data inputs, based on results of the simulation of the reservoir using the sector surrogate model, to use in a subsequent simulation using the model of the reservoir.

Example 2 includes the subject matter of Example 1, and further optionally including generating the data structure representative of grid blocks of the reservoir, wherein the data structure includes values for a plurality of parameters corresponding to respective grid blocks of the reservoir, wherein the values have been previously generated based on an initial simulation result from a model of the reservoir, and wherein the data structure includes geographically-referenced coordinates for grid blocks and production wells in a geographic region, and wherein the sector surrogate model is generated to include a cluster of grid blocks such that a first number of production wells is included within the cluster of grid blocks.

Example 3 includes the subject matter of Example 2, and further optionally including wherein the cluster of grid blocks includes at least one grid block that is not geographically contiguous to at least one other grid block.

Example 4 includes the subject matter of any of Examples 1-3, further optionally including identifying a controlling behavior of the reservoir model based on the initial simulation result; and generating surrogate simulation results using input parameters to the sector surrogate model that have been selected based on parameters related to the controlling behavior.

Example 5 includes the subject matter of Example 4, and optionally further comprising generating a plurality of surrogate simulation results using respective sets of input parameters to generate difference values between surrogate simulation results and between surrogate simulation results and the initial simulation result; and selecting a set of input parameters based on the difference values.

Example 6 includes the subject matter of Example 5 and further optionally comprising wherein at least one set of input parameters includes a spline adjustment of relative permeability at a critical point, and wherein the critical point includes one of a residual end point and a data kink.

Example 7 includes the subject matter of Example 5 and further optionally comprising wherein at least one set of input parameters is generated by truncating capillary pressures.

Example 8 includes the subject matter of Example 5 and further optionally comprising wherein the sets of input parameters are adjusted within respective sensitivity ranges, and wherein the method further comprises determining parameters for which simulations have sensitivities, based on a plurality of simulation results using predicted high and low values for at least one parameter.

Example 9 includes the subject matter of Example 5, and further optionally comprising generating a map of the reservoir based on weighted values for the plurality of parameters.

Example 10 includes the subject matter of any one of Examples 1-9 and further optionally comprising providing coordinates on a surface of the Earth to control a drilling operation based on a subsequent simulation run using the revised data inputs.

Example 11 is a system, which can include means for implementing methods of any of Examples 1-10, comprising memory to store data for generating a reservoir simulation; and one or more processors to generate a sector surrogate model that includes a subset of grid blocks of the reservoir based on a criterion for identifying those grid blocks, represented in a data structure that represents the grid blocks, that negatively affect simulation of the reservoir; provide data inputs to execute a simulation of the reservoir using the sector surrogate model; and generate revised data inputs, based on results of the simulation of the reservoir using the sector surrogate model, to use in a subsequent simulation using the model of the reservoir.

Example 12 can include the subject matter of Example 11, and optionally further including a display to display solutions of the simulation, and wherein the one or more processors are further configured to generate the data structure representative of grid blocks of a reservoir, wherein the data structure includes values for a plurality of parameters corresponding to respective grid blocks of the reservoir, and wherein the values have been previously generated based on an initial simulation result from a model of the reservoir.

Example 13 can include the subject matter of any of Examples 11-12, and optionally further comprising a controller to control a drilling operation at drilling coordinates provided by the one or more processors, based on a subsequent simulation run using the revised data inputs.

Example 14 includes computer-readable medium including instructions that, when executed on a processing unit, cause the processing unit to perform any of the functions of Examples 1-13, including generate a sector surrogate model that includes a subset of grid blocks of a reservoir based on a criterion for identifying those grid blocks, represented in a data structure, that negatively affect simulation of the reservoir; provide data inputs to execute a simulation of the reservoir using the sector surrogate model; and generate revised data inputs, based on results of the simulation of the reservoir using the sector surrogate model, to use in a subsequent simulation using the model of the reservoir.

Example 15 includes the subject matter of Example 14, and further optionally including instructions to cause the processing unit to generate a data structure representative of grid blocks of a reservoir, wherein the data structure includes values for a plurality of parameters corresponding to respective grid blocks of the reservoir, and wherein the values have been previously generated based on an initial simulation result from a model of the reservoir, and wherein the data structure includes geographically-referenced coordinates for grid blocks and production wells in a geographic region, and wherein the sector surrogate model is generated to include a cluster of grid blocks such that a first number of production wells is included within the cluster of grid blocks.

Example 16 includes the subject matter of Example 15, and further optionally including instructions to cause the processing unit to identify grid blocks that were responsible for damping during at least one simulation.

Example 17 includes the subject matter of any of Examples 14-16, and further optionally including causing the processing unit to determine the number of times that a grid blocks limited timestep size; and determine the amount of time that a grid block spends in a three-phase state.

Example 18 includes the subject matter of Example 17, and further optionally including causing the processing unit to generate a plurality of surrogate simulation results using respective sets of input parameters to generate difference values between surrogate simulation results and between surrogate simulation results and the initial simulation result; and select a set of input parameters based on the difference values.

Example 19 includes the subject matter of Example 18, and further optionally including wherein at least one set of input parameters includes a spline adjustment of relative permeability at a critical point, and wherein the critical point includes one of a residual end point and a data kink.

Example 20 includes the subject matter of Example 18, and further optionally including wherein at least one set of input parameters is generated by detecting areas of grid blocks having negative compressibility.

Although specific embodiments have been illustrated and described herein, it will be appreciated by those of ordinary skill in the art that any arrangement that is calculated to achieve the same purpose may be substituted for the specific embodiments shown. Various embodiments use permutations or combinations of embodiments described herein. It is to be understood that the above description is intended to be illustrative, and not restrictive, and that the phraseology or terminology employed herein is for the purpose of description. Combinations of the above embodiments and other embodiments will be apparent to those of ordinary skill in the art upon studying the above description.

What is claimed is:

1. A processor-implemented method comprising:
    generating a plurality of surrogate simulation results using respective sets of input parameters for a reservoir model over a plurality of simulation runs, the reservoir model including a plurality of grid blocks corresponding to different regions of a reservoir formation, and the surrogate simulation results including values of the input parameters computed for each grid block of the reservoir model over a plurality of timesteps during each simulation run,
    identifying grid blocks of the reservoir model for which a convergence of the surrogate simulation results required changes to a timestep size during at least one simulation run;
    generating a sector surrogate model that includes a subset of grid blocks corresponding to the identified grid blocks of the reservoir model, wherein the generated sector surrogate model is stored in memory as a data structure representing the subset of grid blocks;
    providing data inputs to execute a simulation of fluid floe m the reservoir formation using the sector surrogate model; and
    generating revised data inputs to execute a subsequent simulation of fluid flow using the reservoir model, based on results of the simulation executed using the sector surrogate model.

2. The method of claim 1, further comprising:
    generating the data structure representative of the subset of grid blocks of the reservoir model, wherein the data structure includes values for a plurality of parameters corresponding to respective grid blocks of the reservoir model, wherein the values have been previously generated based on an initial simulation result from a model of the reservoir formation, and wherein the data structure includes geographically-referenced coordinates for grid blocks and production wells in a geographic region corresponding to the different regions of the reservoir formation, and wherein the sector surrogate model is generated to include a cluster of grid blocks such that a first number of production wells is included within the cluster of grid blocks.

3. The method of claim 2, wherein the cluster of grid blocks includes at least one grid block that is not geographically contiguous to at least one other grid block.

4. The method of claim 2, further comprising:
identifying a controlling behavior of the reservoir model based on the initial simulation result; and
generating surrogate simulation results using input parameters to the sector surrogate model that have been selected based on parameters related to the controlling behavior.

5. The method of claim 4, further comprising:
computing changes in values of the input parameters between surrogate simulation results generated over the plurality of simulation runs and changes in values of the input parameters between surrogate simulation results generated by each simulation run and the initial simulation result; and
selecting a set of input parameters based on the computed changes in values.

6. The method of claim 5, wherein at least one set of input parameters includes a spline adjustment of relative permeability at a critical point, and wherein the critical point includes at least one of a residual end point or a discontinuity in the relative permeability.

7. The method of claim 5, wherein at least one set of input parameters is generated by truncating capillary pressures.

8. The method of claim 5, wherein the sets of input parameters are adjusted within respective sensitivity ranges, and wherein the method further comprises determining parameters for which simulations have sensitivities, based on a plurality of simulation results using predicted high and low values for at least one parameter.

9. The method of claim 5, further comprising:
generating a map of the reservoir based on weighted values for the plurality of parameters.

10. The method of claim 1, further comprising:
providing coordinates on a surface of the Earth to control a drilling operation based on a subsequent simulation run using the revised data inputs.

11. A system including:
memory to store data for generating a reservoir simulation; and
one or more processors to
generate a plurality of surrogate simulation results using respective sets of input parameters for a reservoir model over a plurality of simulation runs, the reservoir model including a plurality of grid blocks corresponding to different regions of a reservoir formation, and the surrogate simulation results including values of the input parameters computed for each grid block of the reservoir model over a plurality of timesteps during each simulation run,
identify grid blocks of the reservoir model for which a convergence of the surrogate simulation results required changes to a timestep size during at least one simulation run;
generate a sector surrogate model that includes a subset of grid blocks corresponding to the identified grid blocks of the reservoir model, wherein the generated sector surrogate model is stored in memory as a data structure that represents the subset of grid blocks;
provide data inputs to execute a simulation of fluid flow in the reservoir formation using the sector surrogate model; and
generate revised data inputs to execute a subsequent simulation of fluid flow using the reservoir model, based on results of the simulation of the reservoir executed using the sector surrogate model.

12. The system of claim 11, further comprising:
a display to display solutions of the simulation, and wherein the one or more processors are further configured to generate the data structure representative of grid blocks of a geographic region corresponding to the reservoir formation, wherein the data structure includes values for a plurality of parameters corresponding to respective grid blocks of the reservoir model, and wherein the values have been previously generated based on an initial simulation result from a model of the reservoir formation.

13. The system of claim 11, further comprising:
a controller to control a drilling operation at drilling coordinates provided by the one or more processors, based on a subsequent simulation run using the revised data inputs.

14. A non-transitory machine-readable storage device having instructions stored thereon which, when performed by a machine, cause the machine to:
generate a plurality of surrogate simulation results using respective sets of input parameters for a reservoir model over a plurality of simulation runs, the reservoir model including a plurality of grid blocks corresponding to different regions of a reservoir formation, and the surrogate simulation results including values of the input parameters computed for each grid block of the reservoir model over a plurality of timesteps during each simulation run;
identify grid blocks of the reservoir model for which a convergence of the surrogate simulation results required changes to a timestep size during at least one simulation run;
generate a sector surrogate model that includes a subset of grid blocks corresponding to the identified grid blocks of the reservoir model, wherein the generated sector surrogate model is stored in memory as a data structure;
provide data inputs to execute a simulation of fluid flow in the reservoir formation using the sector surrogate model; and
generate revised data inputs to execute a subsequent simulation of fluid flow using the reservoir model, based on results of the simulation executed using the sector surrogate model.

15. The machine-readable storage device of claim 14, wherein the instructions further cause the machine to generate a data structure representative of the subset of grid blocks of the reservoir model, wherein the data structure includes values for a plurality of parameters corresponding to respective grid blocks of the reservoir model, and wherein the values have been previously generated based on an initial simulation result from a model of the reservoir formation, and wherein the data structure includes geographically-referenced coordinates for grid blocks and production wells in a geographic region corresponding to the different regions of the reservoir formation, and wherein the sector surrogate model is generated to include a cluster of grid blocks such that a first number of production wells is included within the cluster of grid blocks.

16. The machine-readable storage device of claim 15, wherein the instructions further cause the machine to identify grid blocks that were responsible for limiting the timestep size during at least one simulation.

17. The machine-readable storage device of claim 15, wherein the instructions further cause the machine to:
   determine the number of times that a grid block limited the timestep size; and
   determine the amount of time that a grid block spends in a three-phase state.

18. The machine-readable storage device of claim 17, wherein the instructions further cause the machine to:
   compute changes in values of the input parameters between surrogate simulation results generated over the plurality of simulation runs and changes in values of the input parameters between surrogate simulation results generated by each simulation run and the initial simulation result; and
   select a set of input parameters based on the computed changes in values.

19. The machine-readable storage device of claim 18, wherein at least one set of input parameters includes a spline adjustment of relative permeability at a critical point, and wherein the critical point includes at least one of a residual end point or a discontinuity in the relative permeability.

20. The machine-readable storage device of claim 18, wherein at least one set of input parameters is generated by detecting areas of grid blocks having negative compressibility.

* * * * *

UNITED STATES PATENT AND TRADEMARK OFFICE
CERTIFICATE OF CORRECTION

PATENT NO. : 10,900,329 B2
APPLICATION NO. : 15/565129
DATED : January 26, 2021
INVENTOR(S) : Richard Edward Hinkley, Terry Wayne Wong and Graham Christopher Fleming It is certified that error appears in the above-identified patent and that said Letters Patent is hereby corrected as shown below:

In the Claims

Column 14, Line 50, Claim 1 change "floe" to -- flow --

Column 14, Line 51, Claim 1 change "m" to -- in --

Column 16, Line 6, Claim 11 delete "of the reservoir"

Signed and Sealed this
Fifteenth Day of June, 2021

Drew Hirshfeld
*Performing the Functions and Duties of the*
*Under Secretary of Commerce for Intellectual Property and*
*Director of the United States Patent and Trademark Office*